United States Patent
Lee et al.

(10) Patent No.: US 12,531,266 B2
(45) Date of Patent: Jan. 20, 2026

(54) BATTERY MODULE AND BATTERY PACK INCLUDING THE SAME

(71) Applicant: LG Energy Solution, Ltd., Seoul (KR)

(72) Inventors: Junghoon Lee, Daejeon (KR); Junyeob Seong, Daejeon (KR); Hyemi Jung, Daejeon (KR); Kwangmo Kim, Daejeon (KR); Dayoung Byoun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 667 days.

(21) Appl. No.: 17/915,644

(22) PCT Filed: Oct. 18, 2021

(86) PCT No.: PCT/KR2021/014439
§ 371 (c)(1),
(2) Date: Sep. 29, 2022

(87) PCT Pub. No.: WO2022/092654
PCT Pub. Date: May 5, 2022

(65) Prior Publication Data
US 2023/0123008 A1    Apr. 20, 2023

(30) Foreign Application Priority Data

Oct. 29, 2020  (KR) .................. 10-2020-0141977

(51) Int. Cl.
*H01M 10/04*      (2006.01)
*H01M 10/653*     (2014.01)
(Continued)

(52) U.S. Cl.
CPC ..... *H01M 10/0481* (2013.01); *H01M 10/653* (2015.04); *H01M 50/183* (2021.01);
(Continued)

(58) Field of Classification Search
CPC .......... H01M 10/0481; H01M 10/653; H01M 50/24; H01M 50/211; H01M 50/183
See application file for complete search history.

(56) References Cited

U.S. PATENT DOCUMENTS 8,541,126 B2 * 9/2013 Hermann ............... H01M 10/66
  429/152
2012/0028107 A1 * 2/2012 Sugita ............... H01M 10/6555
  429/156

(Continued)

FOREIGN PATENT DOCUMENTS

CN    110534843 A   12/2019
CN    210040460 U    2/2020
(Continued)

*Primary Examiner* — Karie O'Neill Apicella
(74) *Attorney, Agent, or Firm* — Bryan Cave Leighton Paisner LLP (57) ABSTRACT

A battery module includes a battery cell stack having a plurality of battery cells, and a barrier layer between adjacent battery cells of the plurality of battery cells. The barrier layer may include a first region and a second region. The first region may include a first material and the second region may include a second material which is different from the first material.

16 Claims, 7 Drawing Sheets

(51) Int. Cl.
  *H01M 50/183* (2021.01)
  *H01M 50/211* (2021.01)
  *H01M 50/24* (2021.01)

(52) U.S. Cl.
  CPC ......... *H01M 50/211* (2021.01); *H01M 50/24* (2021.01); *H01M 2220/20* (2013.01)

(56) References Cited

U.S. PATENT DOCUMENTS

| | | |
|---|---|---|
| 2012/0129038 A1 | 5/2012 | Lim et al. |
| 2013/0252063 A1* | 9/2013 | Park .................... H01M 50/209 429/120 |
| 2016/0268643 A1 | 9/2016 | Mack et al. |
| 2017/0244088 A1 | 8/2017 | Narbonne et al. |
| 2020/0067040 A1 | 2/2020 | Kim et al. |
| 2020/0295415 A1 | 9/2020 | Honda et al. |
| 2021/0013471 A1 | 1/2021 | Honda et al. |

FOREIGN PATENT DOCUMENTS

| | | |
|---|---|---|
| JP | 2014-127342 A | 7/2014 |
| JP | 5786805 B2 | 9/2015 |
| JP | 6352640 B2 | 7/2018 |
| JP | 2018-206605 A | 12/2018 |
| JP | 2019-147357 A | 9/2019 |
| JP | 6657748 B2 | 3/2020 |
| JP | 2020-102345 A | 7/2020 |
| KR | 10-1219237 B1 | 1/2013 |
| KR | 10-1255250 B1 | 4/2013 |
| KR | 10-2015-0049950 A | 5/2015 |
| KR | 10-2019-0044872 A | 5/2019 |
| KR | 10-2020-0021609 A | 3/2020 |
| WO | 2019/107562 A1 | 6/2019 |
| WO | 2019/189850 A1 | 10/2019 |

\* cited by examiner

BATTERY MODULE AND BATTERY PACK INCLUDING THE SAME

CROSS-REFERENCE TO RELATED APPLICATIONS

This application is a National Phase entry pursuant to 35 U.S.C. § 371 of International Application No. PCT/KR2021/014439, filed on Oct. 18, 2021, and claims priority to and the benefit of Korean Patent Application No. 10-2020-0141977 filed on Oct. 29, 2020 with the Korean Intellectual Property Office, the disclosure of which is incorporated herein by reference in its entirety.

TECHNICAL FIELD

The present disclosure relates to a battery module and a battery pack including the same, and more particularly, to a battery module that effectively delays the heat propagation speed between battery cells, and a battery pack including the same.

BACKGROUND

Details in the background section do not constitute the related art but are given only as background information concerning the subject matter of the present disclosure.

Along with the increase of the technological development and demand for a mobile device, the demand for batteries as energy sources is rapidly increasing. In particular, a secondary battery attracts considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle or large-sized devices such as vehicles require high power and large capacity. Therefore, a middle or large-sized battery module having a plurality of battery cells electrically connected to one another is used.

Since the middle or large-sized battery module is preferably manufactured so as to have as small a size and weight as possible, a prismatic battery, a pouch type battery or the like, which can be stacked with high integration and has a small weight relative to capacity, is mainly used as a battery cell of the middle or large-sized battery module. Meanwhile, in order to protect the battery cell stack from external impact, heat or vibration, the battery module may include a module frame which is opened in its front and rear sides and houses the battery cell stack in an internal space.

SUMMARY

The present disclosure to provides a battery module that effectively delays the heat propagation speed between battery cells, and a battery pack including the same.

However, the technical problem to be solved by embodiments of the present disclosure is not limited to the above-described problems, and can be variously expanded within the scope of the technical idea included in the present disclosure.

According to one embodiment of the present disclosure, a battery module is provided. The battery module may comprise a battery cell stack comprising a plurality of battery cells, and a barrier layer between adjacent battery cells of the plurality of battery cells. The barrier layer may comprise a first region and a second region. The first region may comprise a first material and the second region may comprise a second material which is different from the first material.

The first region may be a portion corresponding to a center of one of the plurality of battery cells, and the second region may be a portion corresponding to an edge of the plurality of battery cells.

The barrier layer may comprise the first material having a higher thermal conductivity than the second material.

The first material may have a higher compressibility than the second material.

The barrier layer may include the first region and the second region arranged corresponding to a surface facing a body part of the battery cell.

The body part of the battery cell may correspond to a surface perpendicular to a stacking direction of the battery cell.

The barrier layer may be formed of a flame retardant member.

The first material formed in the first region may include a silicon material, and the second material formed in the second region may include a mica material.

The battery module may comprise at least two barrier layers, and at least two battery cells of the plurality of battery cells may be positioned between two adjacent barrier layers among the at least two barrier layers.

According to another embodiment of the present disclosure, a battery pack comprising the above-mentioned battery module may be provided.

According to yet another embodiment of the present disclosure, a battery cell may be provided. The battery cell may comprise: a case; an electrode assembly in the case; a first electrode protruding from one end of the case; a second electrode protruding from another end of the case; and a barrier layer on a surface of the case. The barrier layer may comprise a first region and a second region. The first region may comprise a first material and the second region may comprise a second material. The first electrode and the second electrode may be bent in one direction. The first region may surround a second region. The first material may have a higher thermal conductivity than the second material. The first material may have a higher compressibility than the second material. The battery cell may further comprise a first sealing part and a second sealing part on two opposite ends of the case; and a connection part between the first sealing part and a second sealing part. The connection part may comprise a protrusion formed on an end of the connection part.

In yet another embodiment of the present disclosure, a method of manufacturing a battery cell may be provided. The method may comprise: providing a case; housing an electrode assembly in the case; forming a first electrode protruding on one end of the case; forming a second electrode protruding on another end of the case; and attaching a barrier layer on a surface of the case. The barrier layer may comprise a first region and a second region. The first region may comprise a first material and the second region may comprise a second material which is different from the first material. The method may further comprise sealing the case by applying heat at a sealing part.

According to embodiments of the present disclosure, the barrier layer formed between a pair of battery cells adjacent to each other in the battery cell stack can function as a flame retardant member, thereby delaying the heat propagation speed between adjacent battery cells when the battery cells ignite.

In addition, the barrier layer is formed so that the materials applied to each position are different, whereby when a cell swelling phenomenon occurs, the compressibility of the barrier layer can be lowered and the performance as a flame retardant member can be maximized, thereby effectively delaying the heat propagation time between battery cells.

The effects of the present disclosure are not limited to the effects mentioned above and additional other effects not described above will be clearly understood from the description of the appended claims by those skilled in the art.

DESCRIPTION OF DRAWINGS

The accompanying drawings illustrate embodiments of the present disclosure, and together with the detailed description of the present disclosure described below, serve to provide a further understanding of the technical aspects of the present disclosure, and thus the present disclosure should not be construed as being limited to the drawing.

DETAILED DESCRIPTION

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Figure 1:
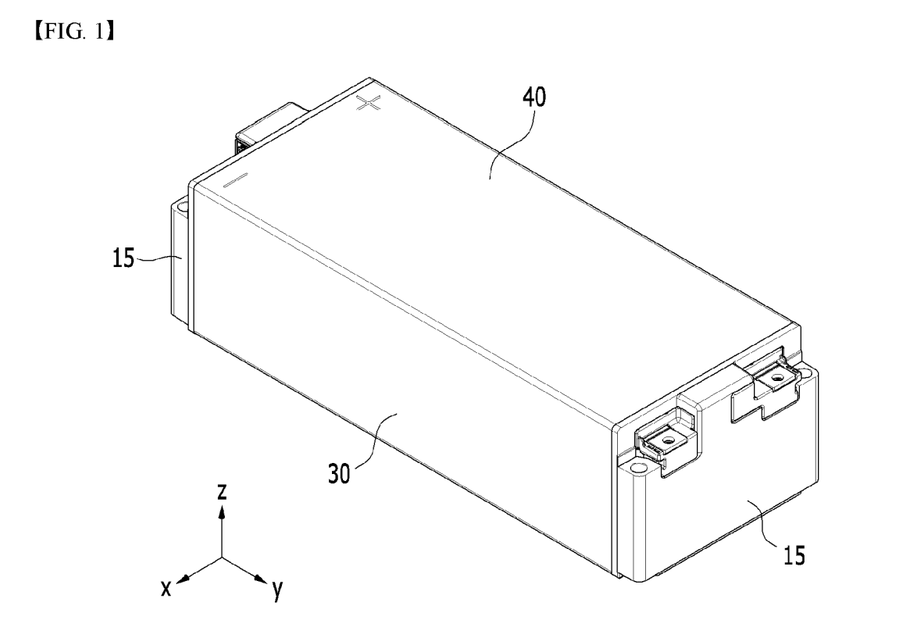
FIG. 1 is a perspective view of a battery module according to one embodiment of the present disclosure.
Figure 2:
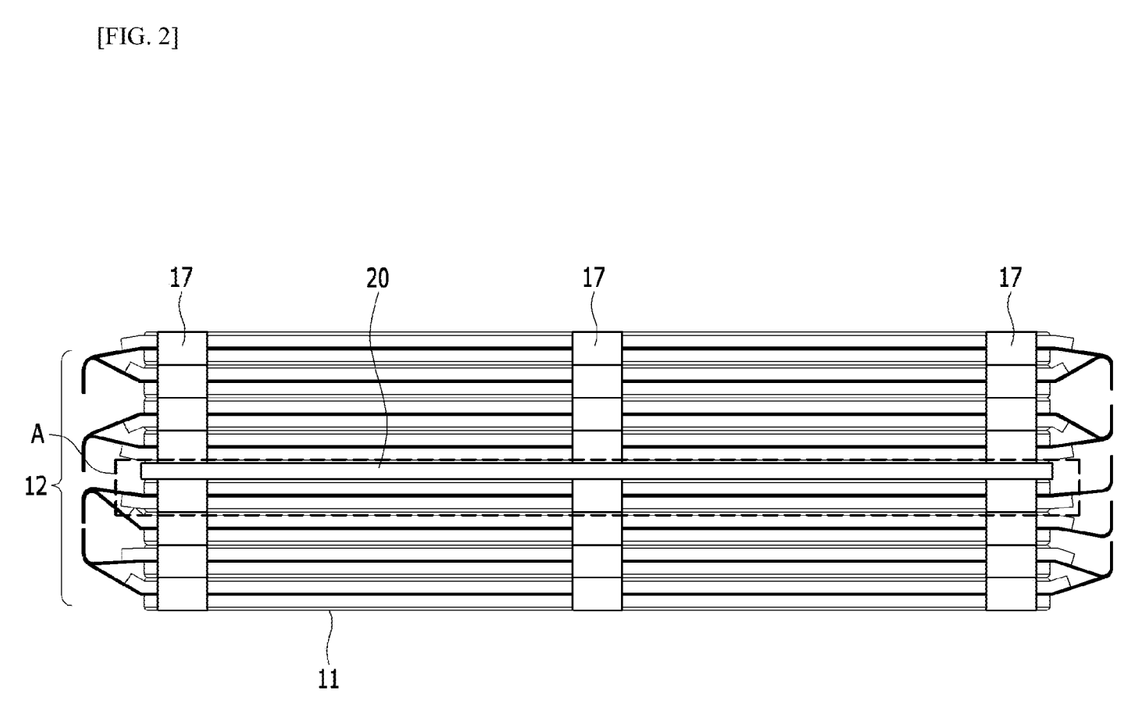
FIG. 2 is a top view of a battery cell stack included in a battery module according to one embodiment of the present disclosure.
Figure 3:
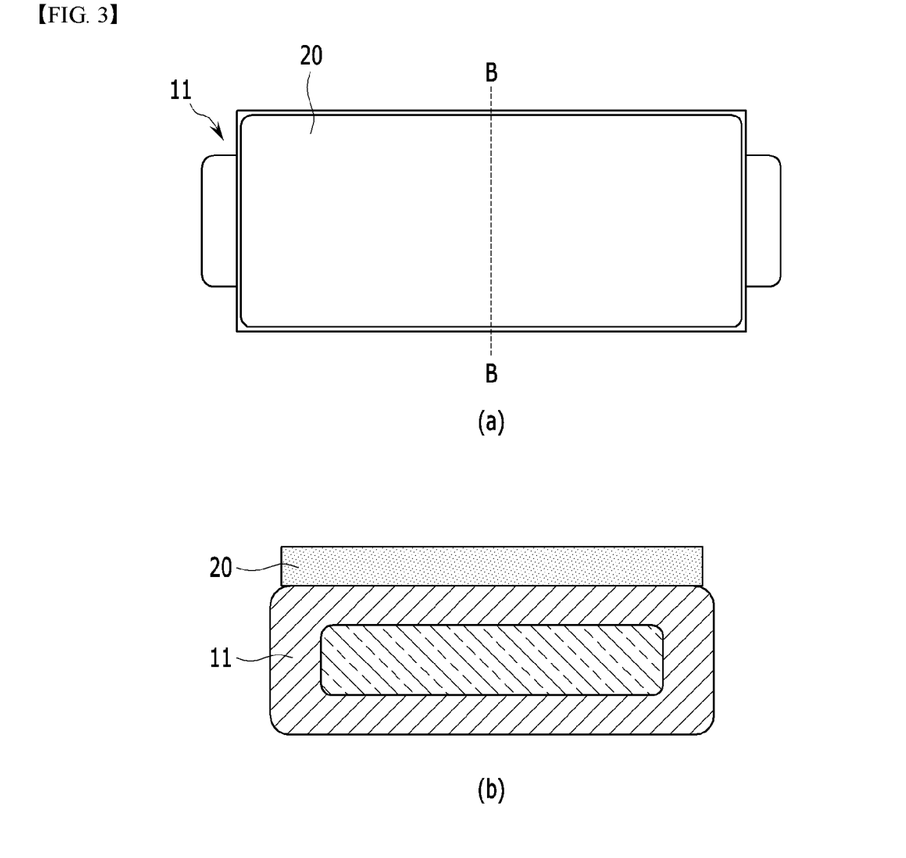
FIG. 3(a) is a top view of the region A of FIG. 2 as viewed from above.
FIG. 3(b) is a cross-sectional view taken along the cross section B-B of FIG. 3(a)

FIG. 1 is a perspective view of a battery module according to one embodiment of the present disclosure. FIG. 2 is a top view of a battery cell stack included in a battery module according to one embodiment of the present disclosure. FIG. 3(a) is a top view of the region A of FIG. 2 as viewed from above, and FIG. 3(b) is a cross-sectional view taken along the cross section B-B of FIG. 3 (a).

Referring to FIGS. 1 and 2, the battery module according to one embodiment of the present disclosure may include a battery cell stack 12 in which a plurality of battery cells 11 are stacked in one direction, module frames 30 and 40 that houses the battery cell stack 12, and end plates 15 that cover the front and rear surfaces of the battery cell stack 12. The module frames 30 and 40 may include a lower frame 30 that covers the lower and both sides of the battery cell stack 12, and an upper plate 40 that covers the upper surface of the battery cell stack 12.

Further, the battery cell stack 12 may include a fixing member 17 that fixes the plurality of battery cells 11 to each other, and the fixing member 17 may be positioned at the center and/or the end of the battery cell stack 12. Additionally, a compression pad 20 is positioned between a pair of battery cells adjacent to each other in the battery cell stack 12.

Referring to FIGS. 2 and 3, the compression pad 20 positioned in the battery cell stack according to one embodiment of the present disclosure may be in contact with the upper surface or the lower surface of the battery cell 11. The compression pad 20 may absorb the impact propagating to the adjacent battery cells 11. Further, when the battery cell 11 ignites, the heat propagation speed can be delayed due to the thickness of the compression pad 20. However, when a swelling phenomenon occurs in the charging/discharging process of the battery cells 11, pressure and/or heat may be applied to the compression pad 20. At this time, the compressibility of the compression pad 20 may vary depending on the position, which may cause a change in the physical properties of the compression pad 20. In addition, when the battery cells 110 ignite, a secondary cell ignition may occur due to the thermal conductivity between adjacent battery cells 11 and the external thermal conductivity caused by flames generated in the battery cells 11.

Figure 4:
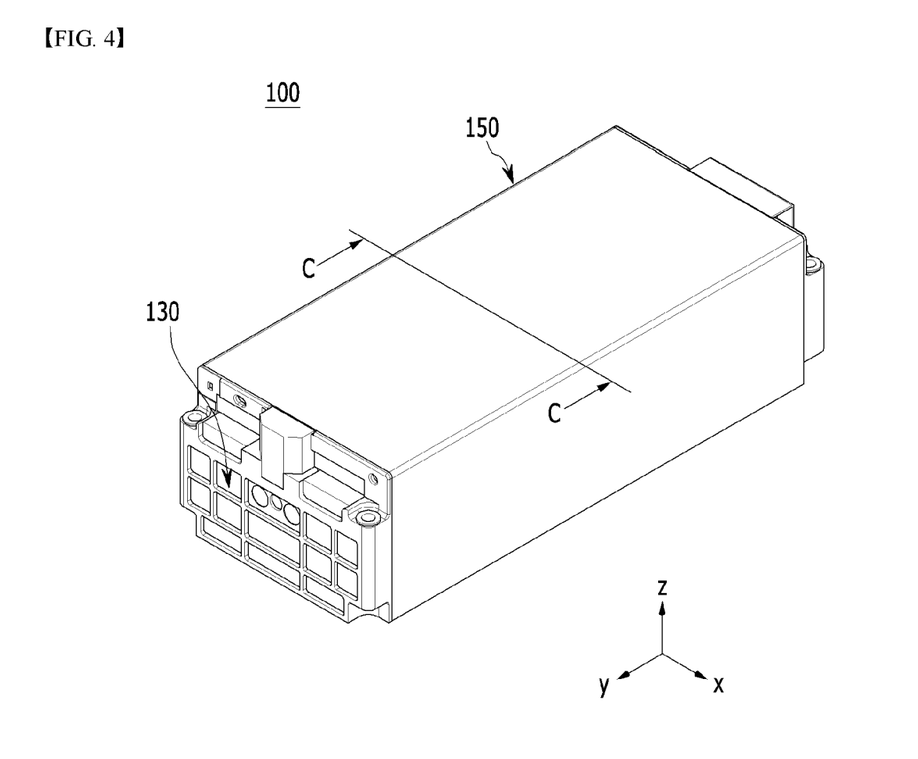
FIG. 4 is a perspective view illustrating a battery module according to an embodiment of the present disclosure.
Figure 5:
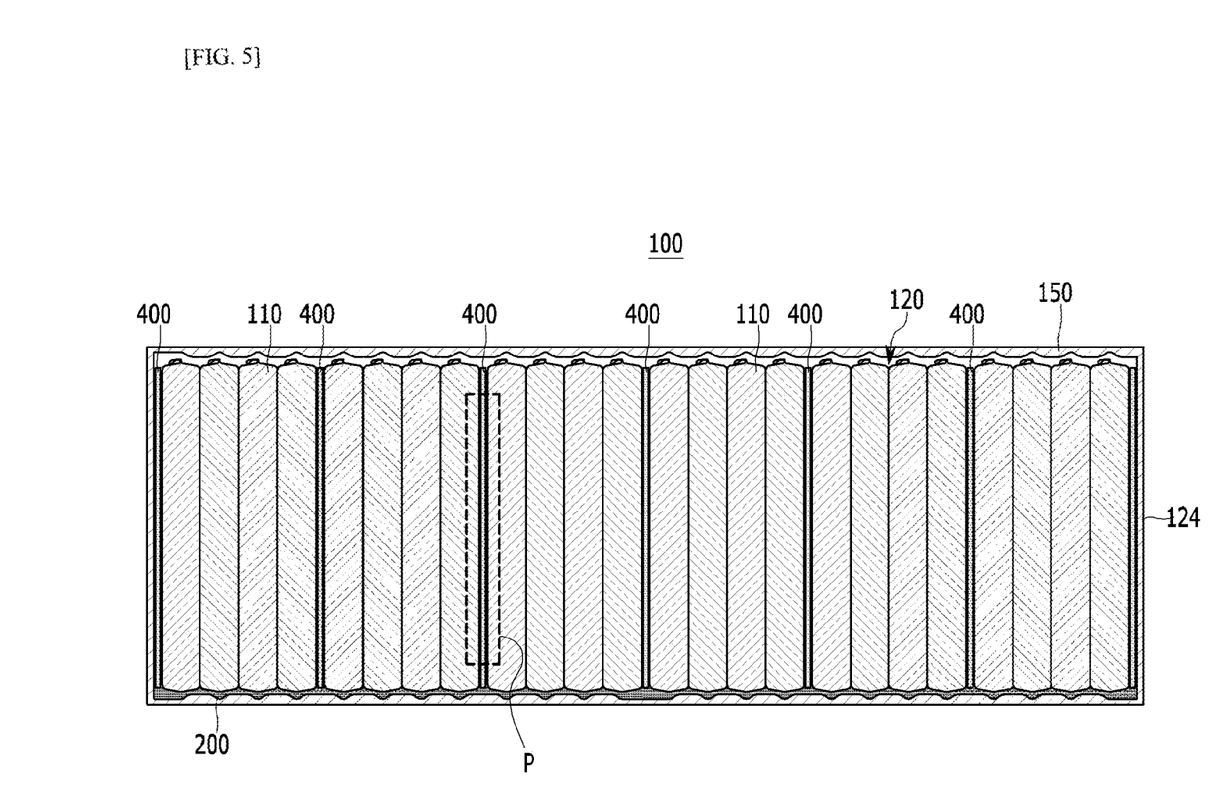
FIG. 5 is a view showing a cross section taken along the cutting line C-C of FIG. 4.
Figure 6:
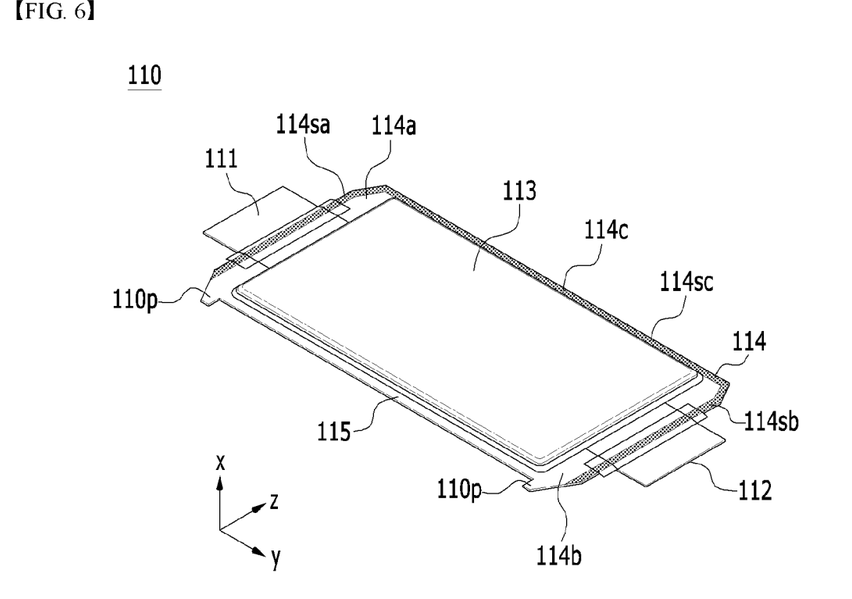
FIG. 6 is a perspective view illustrating one battery cell included in the battery cell stack of FIG. 5.

Consequently, it may be difficult to sufficiently perform the role of delaying the heat propagation speed using only the compression pad 20 according to one embodiment of the present disclosure. Therefore, there is a need to develop a battery module that effectively delays the heat propagation speed between battery cells even when a swelling phenomenon occurs. FIG. 4 is a perspective view illustrating a battery module according to an embodiment of the present disclosure. FIG. 5 is a view showing a cross section taken along the cutting line C-C of FIG. 4. FIG. 6 is a perspective view illustrating one battery cell included in the battery cell stack of FIG. 5.

Referring to FIGS. 4 and 5, the battery module 100 according to an embodiment of the present disclosure includes a battery cell stack 120 including a plurality of battery cells 110, a module frame 150 for housing the battery cell stack 120, and end plates 130 positioned on the front and rear surfaces of the battery cell stack 120, respectively.

As shown in FIG. 4, the module frame 150 may be in the form of a metal plate in which the upper surface, the lower surface and both side surfaces are integrated. That is, in the case of the module frame 150 having a rectangular tube shape, a space in which the battery cell stack 10 may be housed is formed therein, and the end plates 130 are coupled to both ends of rectangular tube shape. However, the present disclosure is not limited thereto, and the module frames 150 of various shapes can be applied. As a possible modification, a module frame in which an upper cover and a U-shaped frame are combined is also possible, and is not particularly limited.

The battery cell stack 120 may include a plurality of battery cells 110 stacked in one direction, and the plurality of battery cells 110 may be stacked in a form erected in parallel with the sidewall 124 of the module frame 150 as shown in FIG. 5.

The battery cell 110 is may be a pouch type battery cell. For example, referring to FIG. 6, the battery cell 110 according to an embodiment of the present disclosure may include a structure in which two electrode leads 111 and 112 face each other and protrude from one end 114a and the other end 114b of the battery body 113. The electrode lead included in each battery cell 110 may be a positive electrode lead or a negative electrode lead, and the ends of the electrode leads 111 and 112 of each battery cell 110 may be bent in one direction, so that the ends of the electrode leads 111 and 112 of the other adjacent battery cells 110 come into contact with each other. The two electrode leads 111 and 112 in contact with each other may be fixed to each other by welding or the like, whereby electrical connection is made between the battery cells 110 inside the battery cell stack. In addition, electrode leads aligned at both ends of the battery cell stack may be coupled to a busbar frame (not shown) to be electrically connected to a busbar mounted on the busbar frame. End plates 130 covering the busbar frame may be respectively provided on both open sides of the module frame 150, and may be coupled to the module frame 150 by a method such as welding.

The battery cell 110 may be manufactured by adhering both ends 114a and 114b of the case 114 and both side surfaces 114c connecting them in a state in which the electrode assembly is housed in the battery case 114. In other words, the battery cell 110 according to an embodiment of the present disclosure may have a total of three sealing parts 114sa, 114sb and 114sc, the sealing parts 114sa, 114sb and 114sc may have a structure that is sealed by a method such as heat fusion, and the remaining other side part may be formed of a connection part 115. A space between both end parts 114a and 114b of the battery case 114 may be defined as a longitudinal direction of the battery cell 110, and a space between the one side surface 114c and the connection part 115 that connect both ends 114a and 114b of the battery case 114 may be defined as a width direction of the battery cell 110.

The connection part 115 may be a region extending along one edge of the battery cell 110, and a protrusion part 110p of the battery cell 110 may be formed at an end part of the connection part 115. The protrusion part 110p may be formed on at least one of both end parts of the connection part 115 and may be protruded in a direction perpendicular to the direction in which the connection part 115 extends. The protrusion part 110p may be positioned between one of the sealing parts 114sa and 114sb of both end parts 114a and 114b of the battery case 114, and the connection part 115.

The cell case 114 may be formed of a laminate structure of a resin layer/metallic thin film layer/resin layer. For example, a surface of the battery case formed of an O(oriented)-nylon layer tends to slide easily by an external impact when a plurality of battery cells are stacked to form a medium or large-sized battery module. Therefore, in order to prevent this sliding and maintain a stable stacked structure of the battery cells, the battery cell stack may be formed by attaching an adhesive member, for example, a sticky adhesive such as a double-sided tape or a chemical adhesive coupled by a chemical reaction upon adhesion, to the surface of the battery case. In one embodiment of the present disclosure, the battery cell stack 120 may be stacked in the x-axis direction.

Referring back to FIG. 5, the thermal conductive resin layer 200 may be positioned between the battery cell stack 120 and the bottom of the module frame 150. The thermal conductive resin layer 200 may transfer heat generated from the battery cell stack 120 to the bottom of the battery module 100 and also may serve to fix the battery cell stack 120 to the bottom part.

According to one embodiment of the present disclosure, a plurality of barrier layers 400 may be interposed between the adjacent battery cells 110. The barrier layer 400 may be formed of a flame retardant member. Additionally, the barrier layer 400 may be formed of a flame retardant pad, and the flame retardant pad may be formed of a silicone foam pad or a mica sheet. The battery module 100 may include at least two or more barrier layers 400, and the at least two or more battery cells 110 may be positioned between two adjacent barrier layers 400 among the barrier layers 400. Alternatively, the battery module 100 may be formed in a structure in which one battery cell 110 is arranged between two adjacent barrier layers 400.

As shown in FIG. 5, the plurality of barrier layers 400 may be inserted one by one whenever four battery cells 110 are stacked, so that the plurality of barrier layers 400 may be arranged at equal intervals. The present disclosure is not limited thereto, and the plurality of barrier layers 400 may be arranged at mutually different intervals. The arrangement of the barrier layer 400 is not particularly limited, and the number and thickness thereof may be appropriately adjusted as necessary. The barrier layers 400 may be arranged apart from each other at equal intervals or at non-equal intervals in this way, thus increasing the thermal impedance of the battery cells 110 in the battery module 100 when thermal runaway occurs, and preventing or delaying the heat transfer between adjacent battery cells. Further, the barrier layer 400 may also be arranged between the battery cell 110 and the sidewall 124 stacked on the outermost side of the battery cell stack 120. The barrier layers 400 may delay or block the transfer of heat from the battery cell to the adjacent battery cell when an issue such as thermal runaway occurs in the battery module 100, and may also play a role of absorbing the expansion of the battery cell 110 and controlling the expansion.

The barrier layers 400 may change their physical properties when swelling of the battery cell 110 occurs inside the battery module 100. For example, the thermal conductivity may vary depending on the position in contact with the battery cell 110. In one example, when the swelling phenomenon of the battery cell 110 occurs, a relatively large volume expansion occurs in the center of the battery cell 110. Thereby, when the thickness of the barrier layer 400 is constant, the thermal conductivity of the portion of the barrier layer 400 corresponding to the position in contact with the center of the battery cell 110 may change, which makes it difficult to sufficiently perform the role of delaying the heat propagation speed. Therefore, in order to effectively delay the heat propagation speed between the battery cells 110 even when a swelling phenomenon occurs, the barrier layer 400 according to the present disclosure may be formed so that materials applied to each position are different. Hereinafter, the barrier layer 400 according to the present disclosure will be described in detail.

Figure 7:
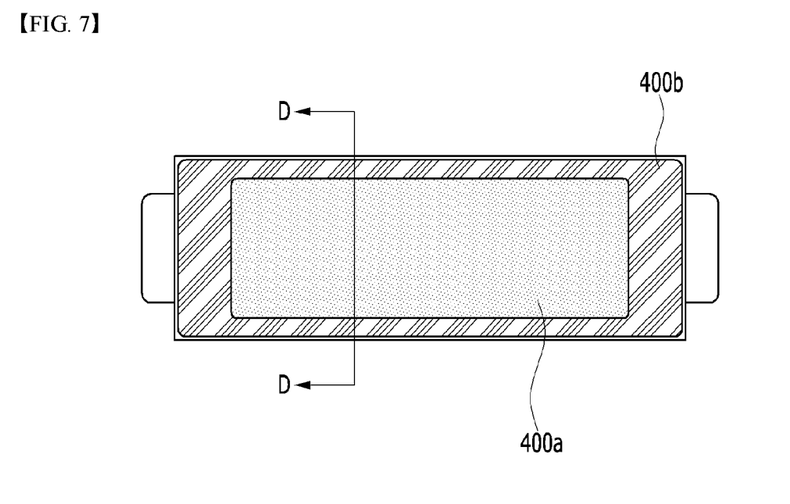
FIG. 7 is a view of the region P of FIG. 5 as viewed from the x-axis direction.
Figure 8:
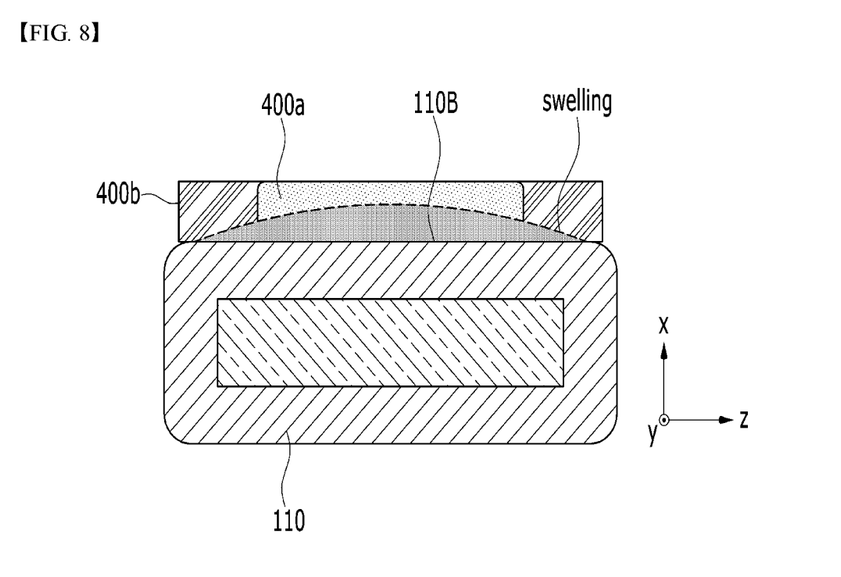
FIG. 8 is a cross-sectional view taken along the cutting line D-D of FIG. 7.

FIG. 7 is a view of the region P of FIG. 5 as viewed from the x-axis direction. FIG. 8 is a cross-sectional view taken along the cutting line D-D of FIG. 7.

Referring to FIGS. 5 and 8, the barrier layer 400 according to the present embodiment includes a first region 400a and a second region 400b, and includes mutually different materials in the first region 400a and the second region 400b. The first region 400a is a portion corresponding to the center of the battery cells 110, and the second region 400b may be a portion corresponding to the edge of the battery cells 110.

The barrier layer 400 includes a first material in the first region 400a and includes a second material in the second region 400b. The first material may have a higher thermal conductivity than the second material, and the first material may have a higher compressibility than the second material. The barrier layer 400 may include a first region 400a and a second region 400b that are distinguished on the basis of a surface facing a body part 110B of the battery cell 110.

The body part 110B of the battery cell 110 may correspond to a surface perpendicular to the stacking direction of the battery cell 110. The material formed in the first region 400a includes a silicon material, and the material formed in the second region 400b may include a mica material. Therefore, in the first region 400a, deterioration of the heat conduction performance due to compression may be prevented through a material having good compressible physical properties such as silicon. In the second region 400b, although the compressibility is relatively reduced, the thermal conductivity may be lowered through a material having excellent flame retardancy performance. In this regard, in the second region 400b corresponding to the outer portion, the swelling phenomenon of the battery cell 110 is relatively small compared to the first region 400a corresponding to the central part of the cells during cell swelling. Thus, it is preferable to use a member with lower thermal conductivity than a material with good compressibility. Accordingly, a material having a different compressibility is applied to each region of the barrier layer 400 to maximize the performance of a flame retardant member, and even when a cell swelling phenomenon occurs, heat transfer time between battery cells may be effectively delayed.

The body part 110B of the battery cell 110 may refer to one surface of the battery cell 110 facing the x-axis direction, which is the direction in which the battery cells 110 are stacked.

Referring to FIG. 8, when swelling of the battery cell 110 occurs, the central part of the body part 110B of the battery cell 110 swells significantly, and the first region 400a of the barrier layer 400 corresponding to the central part of the battery cell 110 may be compressed relatively more than the second region 400b. At this time, the physical properties of the barrier layer 400 are changed. Therefore, the performance of the flame retardant member may be maximized, thereby effectively delaying the heat propagation time between the battery cells 110.

Additionally, one or more of the battery modules according to the present disclosure may be packaged in a pack case to form a battery pack.

The above-mentioned battery module and battery pack including the same may be applied to various devices. Such a device may be applied to a vehicle means such as an electric bicycle, an electric vehicle, or a hybrid vehicle, but the present disclosure is not limited thereto, and is applicable to various devices capable of using a battery module and a battery pack including the same, which also falls under the scope of the present disclosure.

Although the present disclosure has been shown and described above with reference to the embodiments, the scope of the present disclosure is not limited thereto, and numerous other modifications and improvements may be made by those skilled in the art using the principles of the present disclosure described in the appended claims, which also fall within the spirit and scope of the present disclosure.

What is claimed is:

1. A battery module comprising:
   a battery cell stack comprising a plurality of battery cells, and
   a barrier layer between adjacent battery cells of the plurality of battery cells,
   wherein the barrier layer comprises a first region and a second region, the first region comprising a first material and the second region comprising a second material which is different from the first material,
   the first region is a portion corresponding to a center of one of the plurality of battery cells, and the second region is a portion corresponding to an edge of the one of the plurality of battery cells, and
   the first material has a higher thermal conductivity than the second material.

2. The battery module according to claim 1, wherein the first material has a higher compressibility than the second material.

3. The battery module according to claim 1, wherein the barrier layer comprises the first region and the second region arranged corresponding to a surface facing a body part of the battery cell.

4. The battery module according to claim 3, wherein the body part of the battery cell corresponds to a surface perpendicular to a stacking direction of the battery cell.

5. The battery module according to claim 1, wherein the barrier layer is formed of a flame retardant member.

6. The battery module according to claim 5, wherein the first material formed in the first region comprises a silicon material, and the second material formed in the second region comprises a mica material.

7. The battery module according to claim 1, wherein the battery module comprises at least two barrier layers, and
   wherein at least two battery cells of the plurality of battery cells are positioned between two adjacent barrier layers of the at least two barrier layers.

8. A battery pack comprising the battery module according to claim 1.

9. The battery module according to claim 1, wherein the first region surrounds a second region.

10. A battery cell comprising:
    a case;
    an electrode assembly in the case;
    a first electrode protruding from one end of the case;

a second electrode protruding from another end of the case; and a barrier layer on a surface of the case,
wherein the barrier layer comprises a first region and a second region, the first region comprising a first material and the second region comprising a second material, the second region surrounds the first region, and the first material has a higher thermal conductivity than the second material.

11. The battery cell according to claim 10, wherein the first electrode and the second electrode are bent in one direction.

12. The battery cell according to claim 10, wherein the first material has a higher compressibility than the second material.

13. The battery cell according to claim 10, further comprising:
   a first sealing part and a second sealing part on two opposite ends of the case; and
   a connection part between the first sealing part and a second sealing part.

14. The battery cell according to claim 13, wherein the connection part comprises a protrusion formed on an end of the connection part.

15. A method of manufacturing a battery cell comprising:
   providing a case;
   housing an electrode assembly in the case;
   forming a first electrode protruding on one end of the case;
   forming a second electrode protruding on another end of the case; and
   attaching a barrier layer on a surface of the case,
   wherein the barrier layer comprises a first region and a second region, the first region comprising a first material and the second region comprising a second material which is different from the first material, the first region is a portion corresponding to a center of one of the plurality of battery cells, and the second region is a portion corresponding to an edge of the one of the plurality of battery cells, and the first material has a higher thermal conductivity than the second material.

16. The method of claim 15, further comprising sealing the case by applying heat at a sealing part.

* * * * *